United States Patent
Viet

(10) Patent No.: US 8,775,926 B2
(45) Date of Patent: Jul. 8, 2014

(54) STYLESHEET CONVERSION ENGINE

(75) Inventor: Julien Viet, Marseilles (FR)

(73) Assignee: Red Hat, Inc., Raleigh, NC (US)

( * ) Notice: Subject to any disclaimer, the term of this patent is extended or adjusted under 35 U.S.C. 154(b) by 1001 days.

(21) Appl. No.: 12/156,136

(22) Filed: May 30, 2008

(65) Prior Publication Data

US 2009/0300483 A1 Dec. 3, 2009

(51) Int. Cl.
*G06F 17/00* (2006.01)

(52) U.S. Cl.
USPC ............................................. 715/236

(58) Field of Classification Search
USPC ............................................. 715/236
See application file for complete search history.

(56) References Cited

U.S. PATENT DOCUMENTS

| 6,871,245 | B2 * | 3/2005 | Bradley .......................... 710/65 |
| 7,134,073 | B1 * | 11/2006 | Fiedorowicz et al. ........ 715/235 |
| 7,562,070 | B2 * | 7/2009 | Tchaitchian et al. ................... 1/1 |
| 7,653,875 | B2 * | 1/2010 | Jennings et al. .............. 715/235 |
| 7,895,598 | B2 * | 2/2011 | Eide et al. ..................... 719/311 |
| 2003/0037076 | A1 * | 2/2003 | Bravery et al. ................ 707/517 |
| 2003/0046316 | A1 * | 3/2003 | Gergic et al. .................. 707/513 |
| 2006/0069808 | A1 * | 3/2006 | Mitchell et al. ............... 709/246 |
| 2006/0230344 | A1 * | 10/2006 | Jennings et al. .............. 715/522 |
| 2007/0214237 | A1 * | 9/2007 | Stibel et al. ..................... 709/217 |
| 2007/0240040 | A1 * | 10/2007 | Peters et al. ................... 715/522 |
| 2007/0240041 | A1 * | 10/2007 | Pearson ......................... 715/522 |
| 2008/0005661 | A1 * | 1/2008 | Yao et al. ....................... 715/513 |
| 2008/0077855 | A1 * | 3/2008 | Lev et al. ....................... 715/236 |

OTHER PUBLICATIONS

Dugonjic Marko, "Essential of CSS Hacking for Internet Explorer", Jun. 16, 2005, URL<http://www.maratz.com/blog/archives/2005/06/16/essentials-of-css-hacking-for-internet-exploree/>, pp. 1-9.*
Heute, Thomas, et al, JBoss Portal 2.6.0-GA, Reference Guide, Jun. 2007, 6 pages.
Suda, Brian, Digital Web Magazine, "CSS Not([hacks]) Got Something to say?" http://www.digital-web.com/articles/CSS_not_hacks/, Jan. 7, 2008, 6 pages.

* cited by examiner

*Primary Examiner* — Doug Hutton, Jr.
*Assistant Examiner* — Mustafa Amin
(74) *Attorney, Agent, or Firm* — Lowenstein Sandler LLP

(57) ABSTRACT

In one embodiment, a method includes receiving a browser-independent cascading style sheet (CSS) that conforms to a CSS standard, and automatically modifying the browser-independent CSS to incorporate different CSS related features of various browsers. The method further includes creating one or more CSS files customized for the various browsers.

9 Claims, 6 Drawing Sheets

STYLESHEET CONVERSION ENGINE

TECHNICAL FIELD

Embodiments of the present invention relate to the usage of cascading stylesheets (CSS), and more specifically to a CSS conversion engine.

BACKGROUND

Cascading Style Sheet is a mechanism for adding style to web pages written in Hypertext Markup Language (HTML), Extensible Hypertext Markup Language (XHTML), or any other Extensible Markup Language (XML) including, for example, Scalable Vector Graphics (SVG) and XML User Interface Language (XUL).

CSS is used to help web designers to define colors, fonts, layout, and other aspects of document presentation. CSS is designed primarily to enable the separation of document content (written in HTML or a similar markup language) from document presentation (written in CSS). This separation can improve content accessibility, provide more flexibility and control in the specification of presentation characteristics, and reduce complexity and repetition in the structural content. CSS can also allow the same markup page to be presented in different styles for different rendering methods, such as on-screen, in print, by voice (when read out by a speech-based browser or screen reader) and on Braille-based, tactile devices.

CSS information can be provided by various sources. CSS style information can be either attached as a separate document or embedded in the HTML document. Multiple style sheets can be imported, and alternative style sheets can be specified so that the user can choose between them.

The CSS specifications are developed by the World Wide Web Consortium (W3C). Most web browsers provide support for the CSS specifications. However, the browsers are often incorrect in certain areas and fraught with inconsistencies and bugs. The proliferation of such CSS-related inconsistencies and the variation in feature support has made it difficult for web designers to achieve a consistent appearance across platforms. As a result, web designers have to resort to using some workarounds such as CSS filters in order to achieve consistent appearance in browsers that do not have a consistent CSS behavior.

A CSS filter is a coding technique used to hide or show CSS markup depending on the browser's brand and/or version number. CSS filters may include conditional comments that use tags to denote special instructions, and CSS hacks that exploit the rendering flaws of certain browsers. CSS hacks force browsers to read only certain parts of a CSS file to control whether style rules are seen by a specific browser or browser version.

Currently, web designers have to manually add CSS filters to CSS files to achieve desired results across the browsers the web designers choose to support. Hence, web designers have to be very familiar with peculiarities and inconsistencies associated with these browsers, and have to know how to use the CSS filtering techniques. In addition, when a new browser version is released, web designers need to check whether the added CSS filters will still work as intended.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
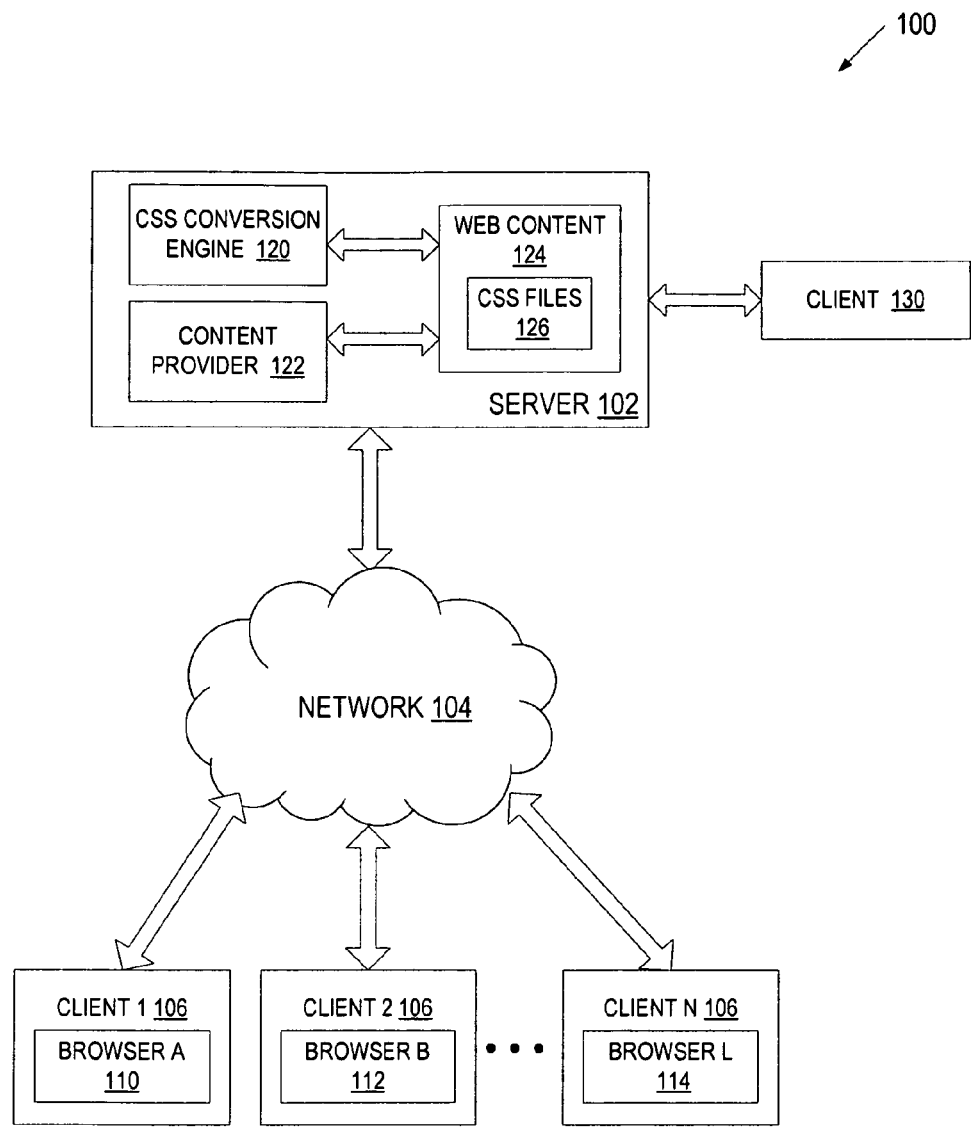
FIG. 1 illustrates an exemplary network architecture in which embodiments of the invention may operate.

Described herein is a method and apparatus for creating cascading style sheet (CSS) files customized for different web browsers and/or web browser versions. In one embodiment, a CSS conversion engine is provided that receives a browser-independent CSS that conforms to a CSS standard, and automatically modifies the browser-independent CSS to incorporate different CSS-related features of various browsers. The various browsers may include different browser types (e.g., Internet Explorer®, Mozilla Firefox®, Safari®, Opera®, Flock®, etc.) and/or different browser versions. Further, the CSS conversion engine creates one or more CSS files customized for various browsers and/or browser versions. As will be discussed in more detail below, the CSS conversion engine may create a single CSS file customized for various browsers, or multiple CSS files customized for individual browsers.

The CSS conversion engine significantly simplifies the CSS customization task of web designers. In particular, web designers are no longer required to be familiar with different interpretations of CSS behavior by various browsers as the CSS customization is done automatically by the CSS conversion engine. In addition, when a new browser version is released, the CSS engine can be adjusted accordingly and then used to automatically recreate the CSS files to integrate peculiarities of the new browser version.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate. The network architecture 100 may include client devices (clients) 106, a client 130, a server 102, and a network 104. The clients 106 and the client 130 may be, for example, personal computers (PCs), mobile phones, palm-sized computing devices, personal digital assistants (PDAs), etc.

The clients 106 are coupled to the server 102 via the network 104, which may be a public network (e.g., Internet) or a private network (e.g., Ethernet or a Local Area Network (LAN)). The clients 106 are operated by end users that request information content from the server 102. The client 130 may be coupled to the server 102 directly (e.g., as a console) or via a public or private network. The client 130 is operated by a web designer or a software developer to provide CSS information to the server 102, as will be discussed in more detail below.

The server 102 may include one or more servers providing desired information content to clients 106. For example, the server 102 may be a web server hosting a website and allowing clients 106 to access information content associated with the website. Alternatively, the server 102 may be an application server that builds a web application for providing desired information content to clients 106.

The server 102 may store web content 124 in a data storage device, which may be part of the server 102 or an external device coupled to the server 102 (e.g., directly or via a private or public network). The server 102 may receive requests for information from clients 106, find requested information in the web content 124, and provide the requested information to the clients 106.

The clients 106 host browsers 110 through 114 that present the requested information to end users. The browsers 110 through 114 may include multiple browser types (e.g., Internet Explorer®, Mozilla Firefox®, Safari®, Opera®, Flock®, etc.) and/or multiple browser versions. The browsers 110, 112 and 114 can present the requested information differently depending on CSS that specifies document presentation characteristics for the web pages (e.g., colors, fonts, layout, and other aspects of document presentation). The browsers 110, 112 and 114 have different interpretations of CSS behavior and different levels of support for the CSS standards. The server 102 addresses these differences by providing CSS information that is customized for the browsers 110, 112 and 114.

In particular, the server 102 hosts a CSS conversion engine 102 and a content provider 112. The CSS conversion engine 120 automatically modifies a standard-compliant CSS file provided by a web designer, and creates one or more CSS files 126 customized for individual browsers 110, 112 and 114 to achieve consistent layout appearance across the different browsers 110, 112 and 114. In one embodiment, the CSS conversion engine 120 creates a separate CSS file for each of the browsers 110, 112 and 114. Alternatively, the CSS conversion engine 120 creates a single CSS file customized for all the browsers 110 through 114. The CSS files 126 may be stored in the same data storage as the web content 124 or in a separate storage within the server 102 or accessible to the server 102 (e.g., via a private or public network).

The content provider 112 receives an information request from a browser such as browser 110, finds a web page including the requested information, and sends the web page with corresponding CSS information to the browser 110. The CSS information can be either attached as a separate document or embedded in the web page.

The CSS conversion engine 120 may provide a user interface to facilitate input of a standard-compliant CSS file by a web designer (e.g., via the client 130), and to allow the web designer to submit a request to convert the standard-compliant CSS file into one or more customized CSS files 126. In addition, in one embodiment, the user interface may allow a web designer or a software developer to provide changes for the CSS conversion engine 120 that may be necessitated by CSS-related peculiarities of a newly released browser or browser version. In an alternative embodiment, once a new browser or browser version is released, a vendor of a CSS conversion engine can upgrade the CSS conversion engine and distribute the upgraded version of the CSS conversion engine to various entities including the server 102. In either embodiment, once the CSS conversion engine 120 is upgraded, it may be executed to re-create existing CSS files 126.

With the CSS conversion engine 120, web designers are no longer required to be aware of different levels of support for the CSS standards by various browsers and browser versions. Once a web designer provides a standard-compliant CSS file for a web document, the CSS conversion engine 120 automatically customizes this CSS file for all browsers and browser versions that the web designer chooses to support. Furthermore, web designers no longer have to manually change existing CSS files when a new browser or browser version is released. Instead, the CSS conversion engine 120 can be upgraded when a new browser or browser version is released, and then executed to recreate existing CSS files automatically.

Figure 2:
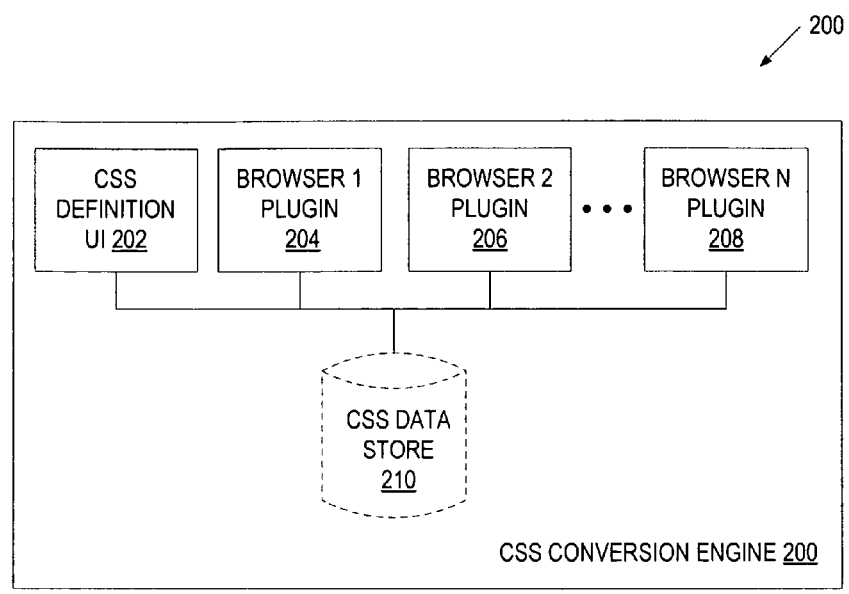
FIG. 2 illustrates a block diagram of one embodiment of a CSS conversion engine.

FIG. 2 is a block diagram of one embodiment of a CSS conversion engine 200. The CSS conversion engine 200 may include a CSS definition user interface (UI) 202, a set of browser plugins 204 through 208, and an optional CSS data store 210.

The CSS definition UI 202 allows a user to identify a web page and to provide a standard-compliant CSS file for this web page. The CSS definition UI 202 may also allow a user to request that the standard-compliant CSS file be customized for various browsers. In addition, the CSS definition UI 202 may allow a user to request that all or some of the CSS files stored in the CSS data store 210 be recreated when the CSS conversion engine 200 is modified.

The browser plugins 204 through 208 correspond to different browser types and/or different browser versions. In one embodiment, each browser plugin creates a separate CSS file customized for a specific browser. Such a CSS file can be created in advance. That is, when a web designer submits a standard-compliant CSS file, the plugins 204 through 208 can be invoked in parallel or consecutively to customize the standard-compliant CSS file for a specific browser or browser version. The resulting CSS files may then be stored in the CSS data store 210. Subsequently, when a request for desired content is received from a client, the client's browser type and version can be determined (e.g., based on a browser agent string included in the request), and a corresponding CSS file can be retrieved from the CSS data store 210.

Alternatively, a CSS file customized for a specific browser and/or browser version can be created dynamically. In particular, upon receiving a request for a specific web page from a client, the client's browser type and version can be determined (e.g., based on a browser agent string included in the request), and a corresponding browser plugin can be invoked to customize a standard-compliant CSS file for this browser and/or version. A standard-compliant CSS file corresponding to the specific web page can be stored in the CSS data store 210 or be requested from a remote location when receiving the request for the specific web page. Once the customized CSS file is created, it can be directly served to the browser and does not have to be stored in the CSS data store 210. Hence, in some embodiments, the CSS conversion engine 200 does not include the CSS data store 210.

In another embodiment, the browser plugins 204 through 208 create a single CSS file customized for all browsers 1 through N. Specifically, the standard-compliant CSS file is first modified by the browser plugin 204 to customize it for browser 1. Resulting CSS file 1 is next modified by browser plugin 206 to further customize it for browser 2. These operations are then repeated for each subsequent browser plugin until the last browser plugin 208 is invoked to add modifications associated with browser N. The final CSS file is then stored in the CSS data store 210 and is subsequently sent to any client requesting a corresponding web page, without determining the client's browser and/or browser version.

When a new browser or a browser version is released, a new browser plugin can be added to the CSS conversion engine 200. The new browser plugin can be added when a user specifies the plugin (e.g., via the CSS definition UI 202), or when the CSS conversion engine 200 is upgraded from a central location.

In one embodiment, in which the browser plugins 204 through 208 create a single CSS file customized for all browsers 1 through N, the customized CSS files stored in the CSS data store 210 are recreated when the new plugin is added, in order to incorporate CSS-related peculiarities associated with the new browser or browser version. The customized CSS files can be recreated upon receiving a user request via the CSS definition UI 202. The user request may identify individual CSS files to be recreated or be directed to all customized CSS files that are being stored in the CSS data store 210. Alternatively, the customized CSS files can be recreated automatically, without user interaction, when a new plugin is added to the CSS conversion engine 200.

In another embodiment, in which the browser plugins 204 through 208 create separate CSS files customized for individual browsers 1 through N, the newly add plugin is invoked for each standard-compliant CSS file in the CSS data store to create CSS files customized for the new browser or browser version.

Browser plugins 204 through 208 add CSS filters, which are designated to hide or show CSS markup depending on the browser's brand and/or version number. However, if a certain browser or browser version provides full support of the CSS standards, then a browser plugin associated with such a browser will not be adding CSS filters to standard-compliant CSS files. Rather, a browser fully supporting the CSS standards will receive a standard-compliant CSS file and simply output it without making any changes.

CSS filters may include conditional comments and CSS hacks. Conditional comments use tags to denote special instructions. For example, they can be used for selectively feeding HTML markup to Internet Explorer® (IE) browsers. The conditional comments can also allow the targeting of specific versions of IE browsers. For example, only Internet Explorer® 5 and 6 will be able to see information within the following comment tags:

```
<!--[if lte IE 6]>
<link rel="stylesheet" type="text/css" href="ie5-6.css">
<![endif]-->
<!--[if lte IE 6]>
<style type="text/css">
  html, body {height: 100%}
</style>
<![endif]-->
```

CSS hacks are style definitions that exploit known peculiarities and bugs to control whether style rules are seen by a specific browser or browser version. For example, the @import statement is not supported in Netscape® 4, so the @import statement can be used to import stylesheets from a small inline stylesheet to hide it from Netscape® 4. Some browsers may have bugs related to parsing of comments and backslash-escaping. For example, in Internet Explorer® for Mac (IE Mac), a comment ending in "\" is not considered properly closed, so rules that need to be ignored in IE Mac can be placed after such a comment. As shown below, another comment can be added after the rule to close the comment for IE mac:

```
/* Ignore the next rule in IE mac \*/
selector { ...styles... }
/* Stop ignoring in IE mac */
```

In another example, a bug known as "Box Model Hack" provides a different set of properties to IE and other browsers. As shown in the example below, the first "voice-family" statement is set to the string m}m, but an IE parser bug will interpret it as a string with a single backslash followed by a "}" for the end of the rule. The "voice-family" statement is chosen because it will not affect rendering on a screen stylesheet. As illustrated below, the second rule uses the "html>body" hack for browsers such as Opera® 5 that have the parsing bug but do not have the box model bug (and, additionally, which support the child selector):

```
#elem {
    width: [IE width];
    voice-family: "V"}\"";
    voice-family:inherit;
    width: [Other browser width];
}
html>body #elem {
    width:[Other browser width];
}
```

Figure 3:
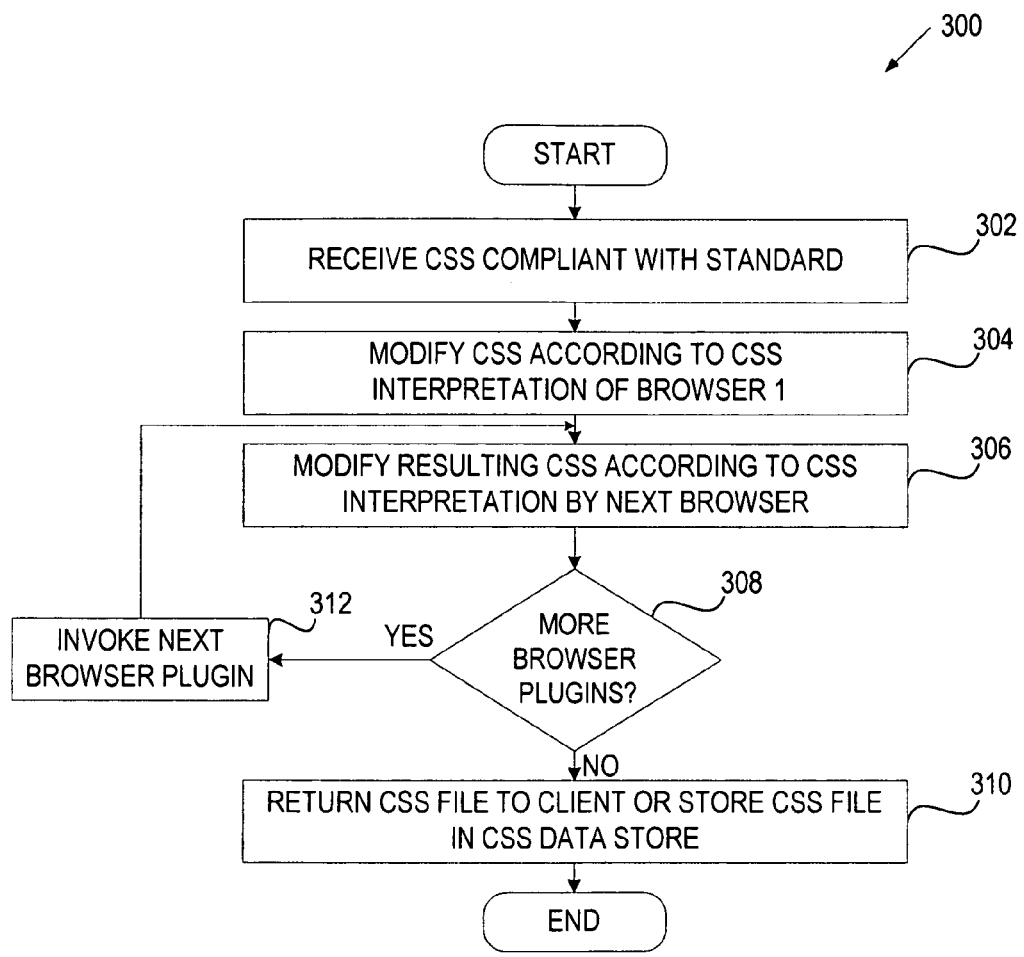
FIG. 3 illustrates a flow diagram of one embodiment of a method for creating a CSS file customized for multiple browsers.

FIG. 3 illustrates a flow diagram of one embodiment of a method 300 for creating a single CSS file customized for various browsers. The method may be performed by processing logic that may comprise hardware (e.g., circuitry, dedicated logic, programmable logic, microcode, etc.), software (such as instructions run on a processing device), or a combination thereof. In one embodiment, method 300 is performed by CSS conversion engine 120 of FIG. 1.

Referring to FIG. 3, method 300 begins with processing logic receiving a CSS file compliant with the CSS standard (W3C standard) (block 402). The CSS file may be provided by a web designer for a specific web page or be requested from a remote location (e.g., a remote repository of CSS files) upon receiving a client request for the specific web page.

At block 304, processing logic modifies the standard-compliant CSS file according to CSS interpretation of a first browser (e.g., Internet Explorer® 7). For example, processing logic may add CSS hacks to the standard-compliant CSS file to achieve desired layout appearance in the first browser. In one embodiment, a browser plugin associated with the first browser is invoked to perform the above modification.

At block 306, processing logic modifies the resulting CSS file according to CSS interpretation of a second browser (e.g., Opera® 5). In one embodiment, a browser plugin associated with the second browser is invoked to perform the above modification.

If there are more plugins (block 308), processing logic invokes the next plugin (block 312) and repeats block 306. Otherwise, processing logic returns the final CSS file to the client or stores the final CSS file in a CSS data store (block 310).

Figure 4A:
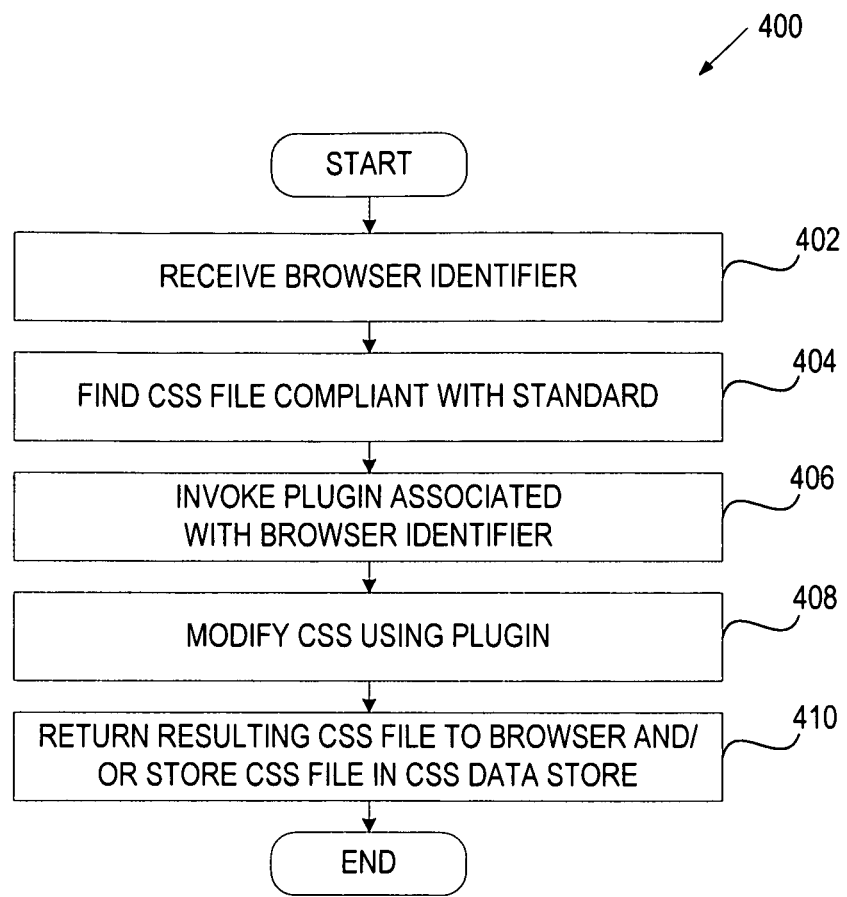
FIG. 4A illustrates a flow diagram of one embodiment of a method for dynamically creating a CSS file customized for a specific browser type or browser version.

FIG. 4A illustrates a flow diagram of one embodiment of a method 400 for dynamically creating a CSS file customized for a specific browser. The method may be performed by processing logic that may comprise hardware (e.g., circuitry, dedicated logic, programmable logic, microcode, etc.), software (such as instructions run on a processing device), or a combination thereof. In one embodiment, method 400 is performed by CSS conversion engine 120 of FIG. 1.

Referring to FIG. 4A, method 400 begins with processing logic receiving an identifier of a browser (block 402). The browser identifier may be provided in a client request for content (e.g., as a browser agent string).

In response, processing logic may search a CSS data store for a CSS file associated with the requested web page and customized for the above browser. If such a CSS file has not yet been created, processing logic finds a standard-compliant CSS file associated with the requested web page (block 404). Alternatively, processing logic may not use the CSS data store but rather prompt a user for the standard-compliant CSS or request the standard-compliant CSS from a remote location.

Next, processing logic invokes a plugin associated with the browser identifier (block 406). The plugin modifies the standard-compliant CSS file according to CSS interpretation of the client's browser (block 408) and causes the resulting CSS file to be returned to the client with the requested web page and/or store the resulting CSS file in the CSS data store (block 410) for use in response to subsequent client requests.

Figure 4B:
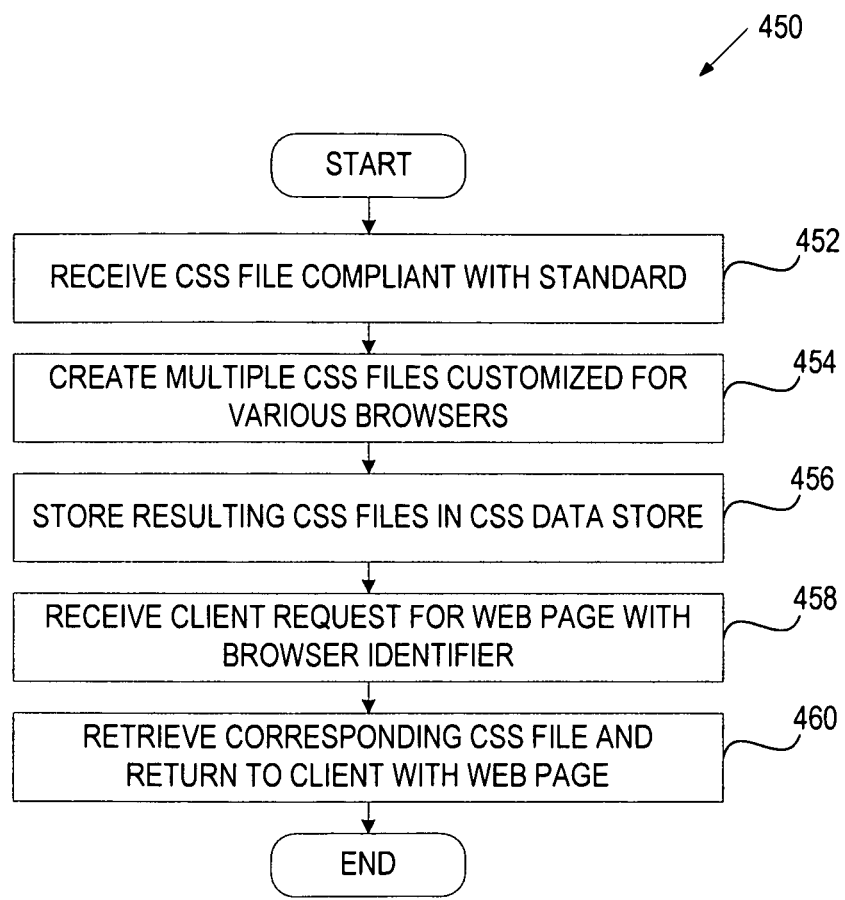
FIG. 4B illustrates a flow diagram of one embodiment of a method for creating multiple CSS files, where each CSS file is customized for a distinct browser type or browser version.

FIG. 4B illustrates a flow diagram of one embodiment of a method 450 for creating multiple CSS files, where each CSS file is customized for a distinct browser type or browser version. The method may be performed by processing logic that may comprise hardware (e.g., circuitry, dedicated logic, programmable logic, microcode, etc.), software (such as instructions run on a processing device), or a combination thereof. In one embodiment, method 450 is performed by server 102 of FIG. 1.

Referring to FIG. 4B, method 450 begins with processing logic receiving a CSS file compliant with the CSS standard (block 452). The CSS file may be provided by a web designer for a specific web page, along with a request to create CSS files customized for various browsers.

At block 454, processing logic creates multiple CSS files customized for individual browsers (e.g., using corresponding browser plugins). At block 456, processing logic stores resulting CSS files in the CSS data store, where each CSS file is stored in associated with a relevant web page and a relevant browser identifier.

Subsequently, at block 458, processing logic receives a request for desired content from a client and determines an identifier of the client's browser (e.g., using a browser agent string included in the request). In response, processing logic retrieves a corresponding CSS file from the CSS data store and returns the requested web page(s) with the retrieved CSS file to the client (block 460).

Figure 5:
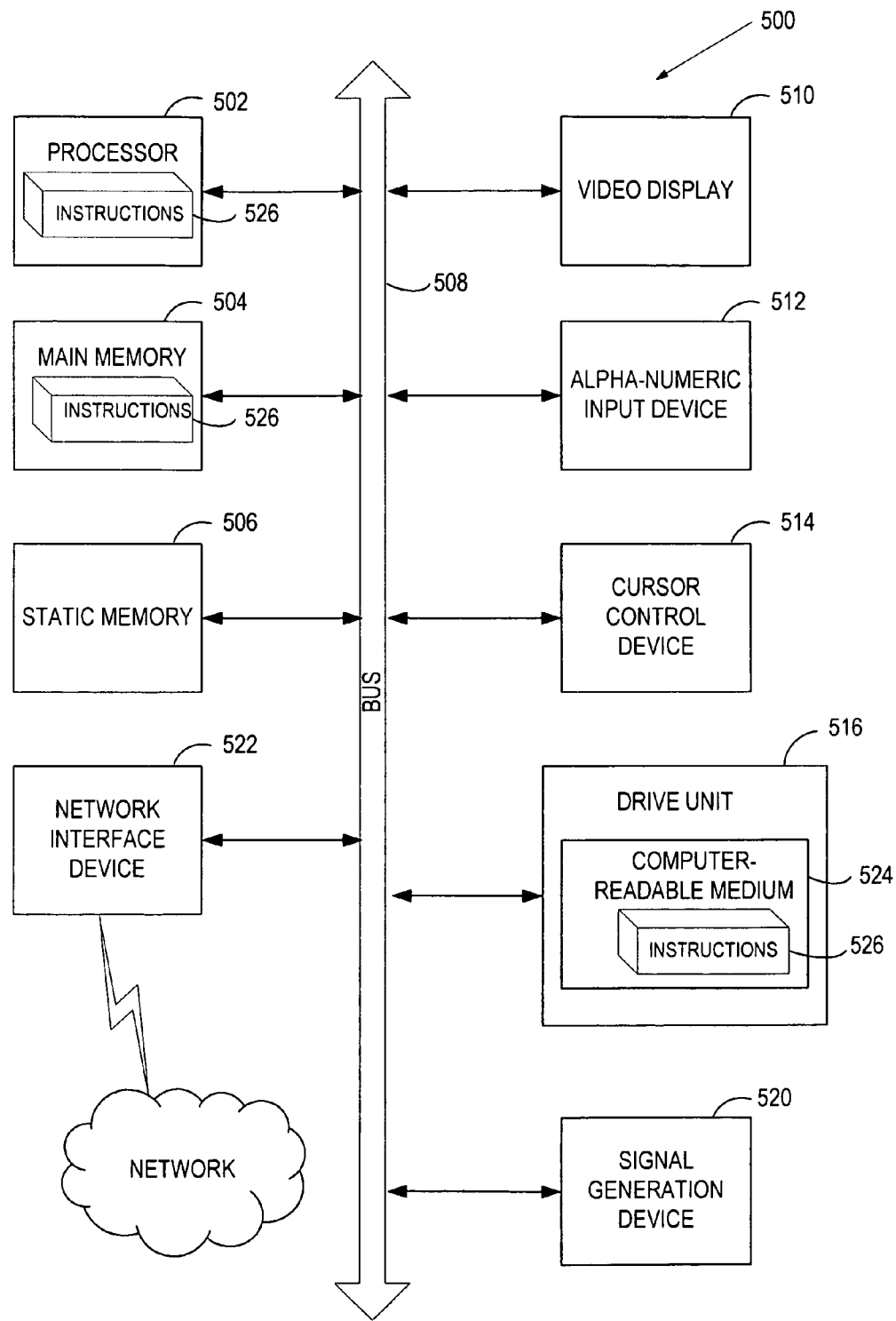
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a browser-independent cascading style sheet (CSS) file that conforms to a CSS standard, wherein the browser-independent CSS file is not customized for a specific browser type;
creating, by a processing device, from the browser-independent CSS file, a custom CSS file customized for a plurality of browsers via a plurality of plugins, wherein each plugin of the plurality of plugins is configured for a corresponding one of the plurality of browsers, wherein creating the custom CSS file comprises:
applying, via a first plugin of the plurality of plugins, one or more first CSS filters to the browser-independent CSS file according to a first interpretation of CSS behavior by a corresponding first browser of the plurality of browsers to create a first adjusted CSS file, at least one of the first CSS filters comprising a CSS hack;
applying, via a second plugin of the plurality of plugins, one or more second CSS filters to the first adjusted independent CSS file according to a second interpretation of CSS behavior by a second browser of the plurality of browsers to create a second adjusted CSS file; and
repeating the applying via each remaining plugin of the plurality of plugins for each corresponding remaining browser of the plurality of browsers to create the custom CSS file.

2. The method of claim 1 wherein at least one of the first CSS filters or the second CSS filters comprises a Conditional Comment.

3. The method of claim 1 wherein a plugin associated with one of the plurality of browsers that is compliant with the CSS standard refrains from modifying a corresponding CSS file.

4. The method of claim 1 further comprising:
providing a user interface allowing a user to submit a request to recreate existing CSS files.

5. A system comprising:
a memory;
a processing device coupled to the memory;
a user interface, executable by the processing device, to receive a browser-independent cascading style sheet (CSS) file that conforms to a CSS standard, wherein the browser-independent CSS file is not customized for a specific browser type; and
a CSS conversion engine, executed by the processing device, to:
create, from the browser-independent CSS file, a custom CSS file customized for a plurality of browsers via a plurality of plug-ins, wherein each plug-in of the plurality of plug-ins is configured for a corresponding one of the plurality of browsers, wherein creating custom CSS file comprises:
applying, via a first plug-in of the plurality of plug-ins, one or more first CSS filters to the browser-independent CSS file according to a first interpretation of CSS behavior by a corresponding first browser of the plurality of browsers to create a first adjusted CSS file, at least one of the first CSS filters comprising a CSS hack;
applying, via a second plug-in of the plurality of plug-ins, one or more second CSS filters to the first adjusted CSS file according to a second interpretation of CSS behavior by a second browser of the plurality of browsers to create a second adjusted CSS file; and
repeating the applying via each remaining plug-in of the plurality of plug-ins for each corresponding remaining browser of the plurality of browsers to create the custom CSS file.

6. The system of claim 5, wherein a plugin associated with one of the plurality of browsers that is compliant with the CSS standard refrains from modifying a corresponding CSS file.

7. The system of claim 5, wherein the user interface allows a user to submit a request to recreate existing CSS files.

8. A non-transitory machine-accessible storage medium comprising instructions that, when executed by a processing device, cause the processing device to:
receive a browser-independent cascading style sheet (CSS) file that conforms to a CSS standard, wherein the browser-independent CSS file is not customized for a specific browser type;
create, by the processing device, from the browser-independent CSS file, a custom CSS file customized for a plurality of browsers via a plurality of plug-ins, wherein each plug-in of the plurality of plug-ins is configured for a corresponding one of the plurality of browsers, wherein to create the custom CSS file, the processing device is to:
apply, via a first plug-in of the plurality of plug-ins, one or more first CSS filters to the browser-independent CSS file according to a first interpretation of CSS behavior by a corresponding first browser of the plurality of browsers to create a first adjusted CSS file, at least one of the first CSS filters comprising a CSS hack;
apply, via a second plug-in of the plurality of plug-ins, one or more second CSS filters to the first adjusted CSS file according to a second interpretation of CSS behavior by a second browser of the plurality of browsers to create a second adjusted CSS file; and repeat the applying via each remaining plug-in of the plurality of plug-ins for each corresponding remaining browser of the plurality of browsers to create the custom CSS file.

9. The non-transitory machine-accessible storage medium of claim 8 wherein the processing device is further to:

provide a user interface allowing a user to submit a request to recreate existing CSS files.

* * * * *